3,119,853
PHOSPHORUS BORON COMPOUNDS
Theodor Reetz, Webster Groves, and William D. Dixon, Kirkwood, Mo., assignors to Monsanto Chemical Company, St. Louis, Mo., a corporation of Delaware
No Drawing. Filed Jan. 23, 1961, Ser. No. 83,933
19 Claims. (Cl. 260—429.9)

This invention relates to a new class of phosphorus boron compounds and to the methods of preparing the same. More particularly, it is concerned with novel compounds which may be designated as substituted phosphito borohydrides.

It is a primary object of this invention to provide a novel class of oxygen-containing, phosphorus boron compounds. It is another object of this invention to provide methods for the preparation of such new phosphorus boron compounds. Still other objects, advantages and features of the invention will become apparent upon consideration of the following detailed description and the examples attendant thereto.

Although hydrocarbon substituted phosphorus boron compounds have been shown in the prior art, it does not appear that such compounds, containing oxygen atoms, have been previously reported. The new compounds of this invention may be characterized by the following structural formula:

(I)
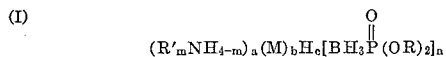

where R' is selected from alkyl radicals having from 1 to 8 carbon atoms, $m$ is a whole number from 0 to 3, M is a metal having from 1 to 2 free valences and selected from Li, Na, K, Be, Mg, Ca, Sr, Ba, Cu, Zn, Cd, Sn, Pb, Mn, Fe, Co, Ni and V, $a$, $b$ and $c$ are selected from 0 and 1 provided that only one of $a$, $b$ and $c$ is equal to 1, and $n$ is selected from 1 and 2 provided that $n$ is equal to the valence of the moiety outside the brackets of the above formula.

In said formula, R is selected from the group consisting of saturated aliphatic radicals having from 1 to 18 carbon atoms, alicyclic radicals having from 5 to 6 carbon atoms in the ring, and aryl radicals. As employed herein, the term saturated aliphatic radicals designates the straight and branched chain hydrocarbon radicals, and also the mono and disubstituted derivatives thereof wherein the substituents comprise chlorine, bromine, lower alkoxy and phenyl. Illustrative of such aliphatic radicals are the following: methyl, ethyl, isopropyl, tert.-butyl, 2-ethylhexyl, tridecyl, octadecyl, benzyl, phenylethyl, chloroethyl, 1,2-dibromopropyl, methoxypropyl, ethoxyethyl, and the like. As employed herein, the term alicyclic radicals designates cyclopentyl and cyclohexyl, and the mono and disubstituted derivatives thereof wherein the substituents comprise those noted above for the aliphatic radicals plus lower alkyl. Exemplary substituted alicyclics include methylcyclopentyl, diethylcyclohexyl, chlorocyclopentyl, methoxycyclohexyl and the like. As employed herein, the term aryl radicals designates phenyl and naphthyl, and the mono and disubstituted derivatives thereof wherein the substituents comprise lower alkyl, lower alkoxy, chlorine and bromine. Among the substituted aryl radicals are such as tolyl, xylyl, ethylphenyl, dibromophenyl, methylnaphthyl, methoxyphenyl, chloronaphthyl and the like.

It is thus apparent that the novel compounds of this invention include the free acids, and also the metal, amine and ammonium salts of such acids. Although these acids contain both protonic and hydridic hydrogen, they are relatively stable and decompose quite slowly at room temperature. This permits the ready preparation of the salts by reaction of an acid with an organic base or a metal carbonate or hydroxide.

Those acids where R is methyl or ethyl are quite soluble in water. The other acids within the formula above are either only very slightly soluble in water or are practically insoluble. On the other hand, the salts of this invention are mostly crystalline solids which are readily soluble, not only in water, but in many other organic solvents such as benzene, alcohols, ethers, etc. This feature permits their facile use as reagents or components in organic solutions.

The compounds of this invention find utility as additives for the higher molecular weight alcohols produced by the Oxo process to prevent coloration of said alcohols during their conversion to esters. These compounds may also be employed as blowing agents for epoxy resins since they release hydrogen when heated. Another use for the compounds of this invention is as reducing agents. The actual reducing value of specific substances may be determined by consideration of their consumption of iodine.

In accordance with this invention, the new compounds of the formula set forth above may be prepared by reacting a hydrogen phosphonate of the structure

where R has the same meaning as above, or an alkali metal derivative thereof, with a compound of the class which is capable of releasing the borine group, BH$_3$. Compounds within said class include the trialkylamine borines such as trimethylamine borine, triethylamine borine, tri-tert.-butylamine borine and the like; boron hydrides such as diborane; and the metallic borohydrides such as those of the alkali metals, e.g., sodium, lithium, potassium, etc.

Although the above reaction will proceed quite readily when diborane or a trialkylamine borine is employed, it has been found that a promoter should be used when the compounds of this invention are to be prepared from a metallic borohydride. Those promoters which are preferred include (a) carbonyl containing compounds, (b) organic acids, (c) inorganic acids and (d) boronfluoride and its etherates. Suitable carbonyl containing compounds include carbon dioxide, ketones such as acetone, diethyl ketone, methylethyl ketone and the like, and aldehydes such as acetaldehyde, butyraldehyde, benzaldehyde and the like. The hydrohalic acids such as hydrochloric, hydrobromic and hydrofluoric may serve as promoters, as well as the lower organic acids having up to about 5 carbon atoms. The boronfluoride etherates employed as promoters include the BF$_3$ complexes with methyl ether, ethyl ether, methylethyl ether, phenylethyl ether, tetrahydrofuran and the like. Illustrative of these promoted reactions are the following:

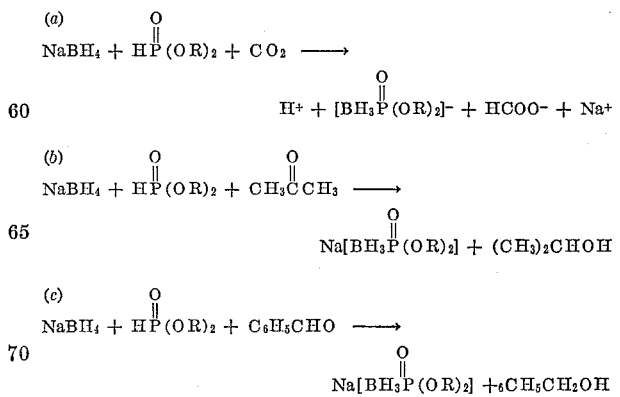

(d)

$$NaBH_4 + H\overset{O}{\underset{\|}{P}}(OR)_2 + CH_3COOH \longrightarrow$$

$$H^+ + [BH_3\overset{O}{\underset{\|}{P}}(OR)_2]^- + CH_3COO^- + Na^+ + H_2$$

(e)

$$NaBH_4 + H\overset{O}{\underset{\|}{P}}(OR)_2 + HCl \longrightarrow H[BH_3\overset{O}{\underset{\|}{P}}(OR)_2] + NaCl + H_2$$

(f)

$$3NaBH_4 + 4H\overset{O}{\underset{\|}{P}}(OR)_2 + 4(BF_3 \cdot 2C_2H_5OC_2H_5) \longrightarrow$$

$$4H[BH_3\overset{O}{\underset{\|}{P}}(OR)_2] + 3NaBF_4 + 8C_2H_5OC_2H_5$$

As will be seen from (b) and (c), the use of a carbonyl compound such as an aldehyde or ketone produces a salt of the acid, $$H[BH_3\overset{O}{\underset{\|}{P}}(OR)_2]$$

On the other hand, when the promoter is a strong acid such as HCl in (e), said free acid is produced. When the promoter is a BF$_3$ etherate, said free acid is also formed as seen in (f). With promoters such as carbon dioxide or lower organic acids, which may be considered as being of relatively weak acidic nature, an additional reagent is needed to produce the desired product. If said desired product is the free acid, the reagent employed is a strong acid such as HCl. Should the desired product be the salt of said free acid, a basic reagent such as an alkali metal hydroxide or carbonate would be used.

When diborane is used as a source of the BH$_3$ group, the acid, $$H[BH_3\overset{O}{\underset{\|}{P}}(OR)_2]$$

where R has the same meaning as above, or its alkali metal salts, may be directly prepared. The following equations are illustrative of such preparations.

$$B_2H_6 + 2H\overset{O}{\underset{\|}{P}}(OR)_2 \longrightarrow 2H[BH_3\overset{O}{\underset{\|}{P}}(OR)_2]$$

$$B_2H_6 + 2Na\overset{O}{\underset{\|}{P}}(OR)_2 \longrightarrow 2Na[BH_3\overset{O}{\underset{\|}{P}}(OR)_2]$$

When the BH$_3$ source is a trialkylamine borine, the alkali metal salts of the above noted acid may be directly prepared as seen in the following equation:

$$(C_2H_5)_3NBH_3 + Na\overset{O}{\underset{\|}{P}}(OR)_2 \longrightarrow Na[BH_3\overset{O}{\underset{\|}{P}}(OR)_2] + (C_2H_5)_3N$$

In accordance with this invention, the metal, amine and ammonium salts defined by Formula I may be prepared from the acid, $$H[BH_3\overset{O}{\underset{\|}{P}}(OR)_2]$$

This is accomplished by reacting said acid with ammonia, with a selected primary, secondary or tertiary amine, or with a selected metal carbonate or hydroxide. It should be apparent that said free acid can be produced by any of the methods noted heretofore or by acidifying a salt of said acid produced by any of said methods. This invention also contemplates the direct conversion of such salts to other and different salts by reaction with (1) an amine hydrochloride wherein the amine group can be any of those within the first pair of parentheses in Formula I, or (2) a metal chloride wherein the metal can be any of those defined by M in said formula. Illustrative of such conversions are the following:

$$Na[BH_3\overset{O}{\underset{\|}{P}}(OR)_2] + C_4H_9NH_2 \cdot HCl \longrightarrow$$

$$NaCl + C_4H_9NH_3[BH_3\overset{O}{\underset{\|}{P}}(OR)_2]$$

$$2Na[BH_3\overset{O}{\underset{\|}{P}}(OR)_2] + ZnCl_2 \longrightarrow 2NaCl + Zn[BH_3\overset{O}{\underset{\|}{P}}(OR)_2]_2$$

These conversions are preferably carried out in an inert organic solvent such as an alcohol, benzene, chloroform or the like. The particular solvent selected for any given conversion should be such that the product salt is soluble therein while the chloride byproduct is insoluble.

The temperatures at which the hydrogen phosphonates or their alkali derivatives are reacted with the borine releasing compounds will vary depending upon the nature of the latter. With the trialkylamine boranes, temperatures from 20° to 120° C. may be employed, the preferred range being from 70° to 100° C. In the case of diborane lower temperatures ranging from −30° to 60° C. are more desirable. When metallic borohydrides are employed temperatures may vary from −40° to 100° C., and usually the reaction is carried out in the presence of ether as a solvent, as, for example, ethyl ether, dioxane, tetrahydrofuran and the like.

The invention will be more fully understood by reference to the following examples which provide an indication of suitable reactants, solvents, and the proportions of each as well as temperatures to be used in preparing the novel oxygen-containing, phosphorus boron compounds. These examples, however, are given for the purpose of illustration only, and are not to be construed as limiting the scope of the present invention in any way.

*Example I*

$$C_4H_9NH_3[BH_3\overset{O}{\underset{\|}{P}}(OCH_3)_2]$$

To a suitable reaction vessel containing a mixture of 7.56 grams of sodium borohydride and 100 ml. of tetrahydrofuran, there is added 22.0 grams of hydrogen dimethyl phosphonate. The contents of the vessel are stirred and treated with CO$_2$ at a temperature of 25–28° C. An exothermic reaction takes place, and after the completion of said reaction, the solvent is evaporated. The reaction mixture is then treated with an excess of dilute HCl and extracted several times with benzene. The benzene extracts are combined and dried with anhydrous sodium sulfate, after which hexane is added. This is followed by the addition of 14.7 grams of tert.-butylamine. A precipitate forms and is filtered off to yield 18.8 grams of tert.-butylammonium dimethylphosphito borohydride, M.P. 137–140° C. Analysis shows 15.10% phosphorus, 6.86% nitrogen and 5.30% boron as against calculated values of 15.72%, 7.11% and 5.49% respectively.

*Example II*

$$C_4H_9NH_3[BH_3\overset{O}{\underset{\|}{P}}(OCH_3)_2]$$

To a suitable reaction vessel containing a mixture of 5.7 grams of sodium borohydride and 100 ml. tetrahydrofuran, there is added 22.0 grams of hydrogen dimethyl phosphonate. The contents of the vessel are stirred, and 28.4 grams of boronfluoride diethyletherate is added at a temperature of −15 to −10° C. At the completion of the addition, the solvent is evaporated and 30 ml. of water is added. The resulting mixture is extracted several times with benzene, and the benzene extracts are combined and dried with anhydrous sodium sulfate. Hexane is then added, after which there is also added 14.7 grams of tert.-butylamine. A precipitate forms and is filtered off to yield 21.6 grams of tert.-butylammonium dimethylphosphito borohydride, M.P. 139–142. Analysis shows 15.1% phosphorus, 6.7% nitrogen and 5.3% borine as against the same calculated values given in Example I.

*Example III*

$$C_4H_9NH_3[BH_3\overset{O}{\underset{\|}{P}}(OCH_3)_2]$$

A solution of 11.0 grams of hydrogen dimethyl phosphonate in 60 ml. of tetrahydrofuran is treated with 1.4 grams of diborane at a temperature of −15 to −10° C. with vigorous stirring. There is then added 25 ml. of water, after which the tetrahydrofuran is evaporated. The reaction mixture is extracted several times with benzene, and the benzene extracts are combined and dried with anhydrous sodium sulfate. Hexane is then added, followed by the addition of 7.4 grams of tert.-butylamine. A precipitate forms and is filtered off to yield 11.0 grams of tert.-butylammonium dimethylphosphito borohydride, M.P. 139–142. Analysis shows 15.1% phosphorus, 6.82% nitrogen and 5.30% boron as opposed to the calculated values set forth in Example I.

*Example IV*

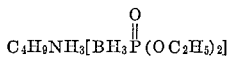

A solution of 12.0 grams of glacial acetic acid in 20 ml. of tetrahydrofuran is added to a vigorously stirred mixture of 30.4 grams of hydrogen diethyl phosphonate, 7.56 grams of sodium borohydride and 100 ml. of tetrahydrofuran. The temperature is maintained between 24 and 28° C. An exothermic reaction takes place, and after the completion thereof, the reaction mixture is heated at 55° C. for a short time. The solvent is evaporated, and the residue is treated with dilute HCl. An oily product is formed and is dissolved in a benzene-hexane mixture. The resulting solution is dried with sodium sulfate, and 14.7 grams of tert.-butylamine is added. A precipitate forms and is filtered off to yield 22.9 grams of tert.-butylammonium diethylphosphito borohydride, M.P. 101–103° C.

*Example V*

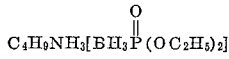

To a mixture of 2.8 grams of sodium borohydride, 15 ml. of tetrahydrofuran and 15.2 grams of hydrogen diethyl phosphonate, there is added 14.2 grams of boronfluoride diethyletherate at a temperature of −15 to −10° C. with vigorous stirring. The solvent is then evaporated from the reaction mixture, and 50 ml. of water is added. The resulting solution is extracted several times with benzene after which the benzene extracts are combined and dried with anhydrous sodium sulfate. Hexane is then added, followed by the addition of 7.4 grams of tert.-butylamine. Upon filtration there is obtained 10.8 grams of tert.-butylammonium diethylphosphito borohydride, M.P. 100–103° C. Analysis shows 13.7% phosphorus, 5.86% nitrogen and 4.7% boron as against calculated values of 13.76%, 6.22% and 4.8% respectively.

*Example VI*

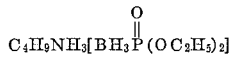

A solution of 13.8 grams of hydrogen diethyl phosphonate in 100 ml. of tetrahydrofuran is treated with 1.38 grams of diborane at −30° C. A small amount of water is then added, and the solvent is evaporated. The resulting solution is extracted several times with benzene, and the benzene extracts are combined and dried with anhydrous sodium sulfate. Hexane is then added, followed by the addition of 14.7 grams of tert.-butylamine. Upon filtration, tert.-butylammonium diethylphosphito borohydride, M.P. 101–103° C., is obtained in good yield.

*Example VII*

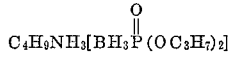

A solution of 12.0 grams of glacial acetic acid in 20 ml. of tetrahydrofuran is added to a vigorously stirred mixture of 7.56 grams of sodium borohydride, 36.5 grams of hydrogen diisopropyl phosphonate and 100 ml. of tetrahydrofuran. The reaction mixture is worked up in the manner described in Example IV. There is obtained 28.3 grams of tert.-butylammonium diisopropylphosphito borohydride, M.P. 144–146° C.

*Example VIII*

To a mixture of 7.56 grams of sodium borohydride, 36.5 grams of hydrogen diisopropyl phosphonate and 100 ml. of tetrahydrofuran, there is added 11.6 grams of acetone. The reaction mixture is worked up in the manner described in Example I. There is obtained 4.5 grams of tert.-butylammonium diisopropylphosphito borohydride, M.P. 144–146° C.

*Example IX*

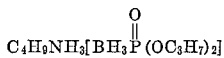

To a mixture of 7.56 grams of sodium borohydride and 100 ml. of tetrahydrofuran, there is added 36.5 grams of hydrogen diisopropyl phosphonate. The resulting mixture is treated with 7.0 grams of anhydrous hydrogen chloride dissolved in 150 ml. of tetrahydrofuran at a temperature of −30 to −20° C. with vigorous stirring. After all of the HCl is added, the tetrahydrofuran is evaporated, and 50 ml. of water is added. The resulting mixture is worked up in the manner described in Example II. There is obtained 21.0 grams of tert.-butylammonium diisopropylphosphito borohydride, M.P. 143–146° C. Analysis shows 12.2% phosphorus, 5.36% nitrogen and 4.10% boron as against calculated values of 12.24%, 5.53% and 4.27% respectively.

*Example X*

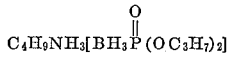

To a suitable reaction vessel containing a mixture of 7.56 grams of sodium borohydride and 100 ml. of tetrahydrofuran, there is added 36.5 grams of hydrogen diisopropyl phosphonate. The resulting mixture is stirred and treated with $CO_2$ at a temperature of 27–30° C. An exothermic reaction takes place, after which the reaction mixture is worked up in the manner described in Example I. There is obtained 25.4 grams of tert.-butylammonium diisopropylphosphito borohydride, M.P. 143–145° C.

*Example XI*

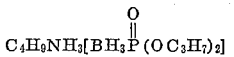

To a suitable reaction vessel containing a mixture of 7.56 grams of sodium borohydride and 100 ml. of tetrahydrofuran, there is added 36.5 grams of hydrogen diisopropyl phosphonate. The resulting mixture is treated with 21.2 grams of benzaldehyde at a temperature of 5–7° C. with vigorous stirring. The reaction mixture is worked up as described in Example I. There is obtained tert.-butylammonium diisopropylphosphito borohydride, M.P. 143–145° C., in good yield.

*Example XII*

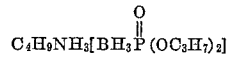

A solution of 16.6 grams of hydrogen diisopropyl phosphonate in 100 ml. of tetrahydrofuran is treated with 1.38 grams of diborane at a temperature of −15 to −10° C. with vigorous stirring. The resulting mixture is worked up in the manner described in Example III to yield 24.7 grams of tert.-butylammonium diisopropylphosphito borohydride, M.P. 143–145° C.

*Example XIII*

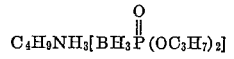

To a suitable reaction vessel containing a mixture of 2.8 grams of sodium borohydride and 50 ml. of tetrahydrofuran, there is added 16.6 grams of hydrogen diisopropyl phosphonate. The resulting mixture is stirred and treated with 14.2 grams of boronfluoride diethyletherate at a temperature of −5 to 0° C. The reaction mixture is worked up in the manner described in Example II except that only 7.4 grams of tert.-butylamine is employed. There is obtained 17.0 grams of tert.-butylammonium diisopropylphosphito borohydride, M.P. 145–146° C.

*Example XIV*

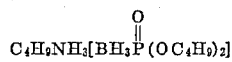
$$C_4H_9NH_3[BH_3\overset{O}{\overset{\|}{P}}(OC_4H_9)_2]$$

A solution of 12.0 grams of glacial acetic acid in 20 ml. of tetrahydrofuran is added to a vigorously stirred mixture of 7.56 grams of sodium borohydride, 39.2 grams of hydrogen dibutyl phosphonate and 100 ml. of tetrahydrofuran. The reaction mixture is worked up in the manner described in Example IV. There is obtained tert.-butylammonium dibutylphosphito borohydride in good yield.

*Example XV*

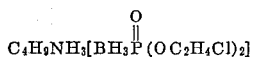
$$C_4H_9NH_3[BH_3\overset{O}{\overset{\|}{P}}(OC_2H_4Cl)_2]$$

A solution of 12.0 grams of glacial acetic acid in 20 ml. of tetrahydrofuran is added to a vigorously stirred mixture of 7.56 grams of sodium borohydride, 41.4 grams of hydrogen di(2-chloroethyl)phosphonate and 100 ml. of tetrahydrofuran. The reaction mixture is worked up in the manner described in Example IV. There is obtained 28.2 grams of tert.-butylammonium di(2-chloroethyl)phosphito borohydride.

*Example XVI*

$$C_4H_9NH_3[CH_3\overset{O}{\overset{\|}{P}}(OC_8H_{17})]$$

A solution of 12.0 grams of glacial acetic acid in 20 ml. of tetrahydrofuran is added to a vigorously stirred mixture of 7.56 grams of sodium borohydride, 61.3 grams of hydrogen di(2-ethylhexyl)phosphonate and 100 ml. of tetrahydrofuran. The reaction mixture is worked up in the manner described in Example IV. There is obtained tert.-butylammonium di(2-ethylhexyl) phosphito borohydride in good yield.

*Example XVII*

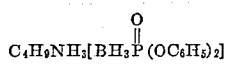
$$C_4H_9NH_3[BH_3\overset{O}{\overset{\|}{P}}(OC_6H_5)_2]$$

A solution of 12.0 grams of glacial acetic acid in 20 ml. of tetrahydrofuran is added to a vigorously stirred mixture of 7.56 grams of sodium borohydride, 46.8 grams of hydrogen diphenyl phosphonate and 100 ml. of tetrahydrofuran. The reaction mixture is worked up in the manner described in Example IV. There is obtained 35.5 grams of tert.-butylammonium diphenylphosphito borohydride, M.P. 134–136° C. Analysis shows 9.51% phosphorus and 3.10% boron as against calculated values of 9.65% and 3.37% respectively.

*Example XVIII*

$$C_4H_9NH_3[BH_3\overset{O}{\overset{\|}{P}}(OC_6H_{11})_2]$$

A solution of 12.0 grams of glacial acetic acid in 20 ml. of tetrahydrofuran is added to a vigorously stirred mixture of 7.56 grams of sodium borohydride, 5.0 grams of hydrogen dicyclohexyl phosphonate and 100 ml. of tetrahydrofuran. The reaction mixture is worked up in the manner described in Example IV. There is obtained 17.6 grams of tert.-butylammonium dicyclohexylphosphito borohydride, M.P. 164–166° C. Analysis shows 9.10% phosphorus, 4.13% nitrogen and 3.20% boron as against calculated values of 9.30%, 4.20% and 3.25% respectively.

*Example XIX*

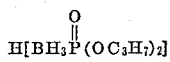
$$H[BH_3\overset{O}{\overset{\|}{P}}(OC_3H_7)_2]$$

Tert.-butylammonium diisopropylphosphito borohydride, 25.3 grams, is treated with 75 ml. of 2 N HCl. An oil is separated and washed with a sodium sulfate solution until the chlorine ion reaction is negative. It is then treated with anhydrous sodium sulfate after which it is filtered. There is obtained 13.4 grams of product. Titration with iodine indicates that said product contains about 76% of hydrogen diisopropylphosphito borohydride, the remainder being water.

*Example XX*

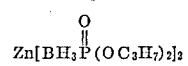
$$Zn[BH_3\overset{O}{\overset{\|}{P}}(OC_3H_7)_2]_2$$

A suitable reaction vessel is charged with 6.0 grams of hydrogen diisopropylphosphito borohydride which contains approximately 25% water. The compound is treated with 2.2 grams of zinc carbonate and 10.0 grams of water until the evolution of carbon dioxide ceases. The reaction mixture is then filtered to remove the excess of zinc carbonate. The filtrate is evaporated in air leaving a crystalline material weighing 5.8 grams. Said material is dissolved in benzene and filtered, after which hexane is added to the filtrate. A crystalline precipitate forms and is filtered off and dried in air. By determination of the reducing value of said product with respect to iodine, the product is identified as zinc diisopropylphosphito borohydride.

*Example XXI*

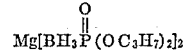
$$Mg[BH_3\overset{O}{\overset{\|}{P}}(OC_3H_7)_2]_2$$

Hydrogen diisopropylphosphito borohydride, 1.0 gram, is treated with 1.0 gram of magnesium carbonate and 5.0 grams of water at room temperature. When the evolution of carbon dioxide ceases, the reaction mixture is filtered, and the filtrate is evaporated in air. There is obtained 0.85 gram of a white powder. Said powder is purified by dissolving it in ethyl acetate, filtering the solution, and evaporating the solvent. A white crystalline product, M.P. 110–115° C., is obtained. Said product is identified by the method described in Example XX as magnesium diisopropylphosphito borohydride.

*Example XXII*

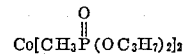
$$Co[CH_3\overset{O}{\overset{\|}{P}}(OC_3H_7)_2]_2$$

Hydrogen diisopropylphosphito borohydride, 1.0 gram, containing about 25% water, is treated with 1.0 gram of cobalt carbonate and 5 ml. of water. When the evolution of carbon dioxide ceases, the reaction mixture is filtered to remove the excess of cobalt carbonate. The filtrate is evaporated in air, and the deep blue residue is dissolved in ether. Upon evaporation of the latter, there is obtained 0.95 grams of fine red-violet crystals. This product is identified by the method described in Example XX as cobalt diisopropylphosphito borohydride.

*Example XXIII*

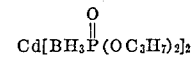
$$Cd[BH_3\overset{O}{\overset{\|}{P}}(OC_3H_7)_2]_2$$

Hydrogen diisopropylphosphito borohydride, 1.0 gram, containing about 25% water, is treated with 1.0 gram of cadmium carbonate and 5 ml. of water. The mixture is stirred at room temperature until the evolution of carbon dioxide ceases, after which the excess of cadmium carbonate is filtered off, and the filtrate is evaporated in air. A semi-crystalline, waxlike residue remains. This is dissolved in ethyl acetate and filtered. The filtrate is evaporated, and the residue, which crystallizes on standing, is cadmium diisopropylphosphito borohydride, M.P. 50–53° C.

*Example XXIV*

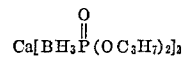
$$Ca[BH_3\overset{O}{\overset{\|}{P}}(OC_3H_7)_2]_2$$

Following the procedure of Example XXIII, 1.0 gram of calcium carbonate is substituted for the cadmium carbonate. After filtration from the ethyl acetate, the filtrate is precipitated with hexane. The precipitate is dissolved in hot hexane, and, on cooling, a glassy, waxy mass precipitates. Said mass becomes crystalline on standing to yield 0.85 gram of calcium diisopropylphosphito borohydride.

*Example XXV*

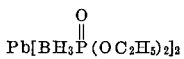

Hydrogen diethylphosphito borohydride, 1.0 gram, containing about 30% water, is treated with 1.5 grams of lead carbonate and 5 ml. of water. The mixture is stirred at room temperature until carbon dioxide ceases to evolve. The reacted mass is filtered, and the filtrate is evaporated in air. The residue is a white powder which is identified as lead diethylphosphito borohydride.

*Example XXVI*

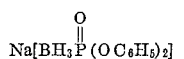

Tert.-butylammonium diphenylphosphito borohydride, 3.2 grams, is treated with 20.0 ml. of 0.5 N NaOH at room temperature. The reaction mixture is subjected to vacuum at said temperature to remove tert.-butylamine and water. There is obtained 3.1 grams of a white crystalline powder which is identified as sodium diphenylphosphito borohydride.

*Example XXVII*

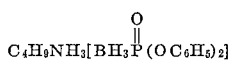

Sodium diphenylphosphito borohydride, 1.275 grams, containing about 16% water is treated with 0.435 gram of tert.-butylamine hydrochloride in absolute ethanol. The sodium chloride which forms is filtered off, and the filtrate is evaporated. The residue is recrystallized from a hexane-benzene mixture to yield 1.15 grams of tert.-butylammonium diphenylphosphito borohydride, M.P. 137–138° C.

*Example XXVIII*

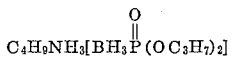

Hydrogen diisopropyl phosphonate, 54.6 grams, is added to a suspension of 6.9 grams of sodium in 250 ml. of toluene at 125° C. with vigorous stirring over a period of about 45 minutes. To this reaction mixture there is added 34.44 grams of triethylamine borine over a period of about 10 minutes. During this addition, the temperature is maintained at 70° C. and is held there for about 1 hour thereafter. The reaction mixture is cooled to room temperature, and water is added to dissolve the sodium diisopropylphosphito borohydride which forms. The water layer is separated, filtered and made acidic by addition of 45 ml. of concentrated hydrogen chloride. Hydrogen diisopropylphosphito borohydride, a liquid, separates and is taken up with benzene. The aqueous layer is then shaken several times with benzene, after which the benzene extracts are combined and dried with sodium sulfate. A large amount of hexane and 25.0 grams of tert.-butylamine are then added, and a crystalline precipitate is formed. Said precipitate is filtered and dried to yield 60.5 grams of the product. Another 5.7 grams is obtained from the mother liquor to give a yield of 87% of theory of tert.-butylammonium diisopropylphosphito borohydride.

It will be apparent that by following the procedures set forth in the preceding examples, other and different phosphito borohydrides may be readily prepared.

While the invention has been described above in accordance with several specific embodiments, it is clear that those skilled in the art may make variations and modifications without departing from the spirit and scope of the present invention.

The embodiments of the invention in which an exclusive property or privilege is claimed are defined as follows:

1. A compound of the structural formula

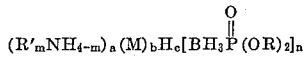

where R' is an alkyl radical having from 1 to 8 carbon atoms; m is a whole number from 0 to 3; M is a metal having from 1 to 2 free valences and selected from the group consisting of Li, Na, K, Be, Mg, Ca, Sr, Ba, Cu, Zn, Cd, Sn, Pb, Mn, Fe, Co, Ni and V; a, b and c are selected from 0 and 1 provided that only one of a, b and c is 1; n is selected from 1 and 2 provided that n is equal to the valence of the moiety outside the brackets in the above formula; and R is selected from the group consisting of saturated aliphatic radicals having from 1 to 18 carbon atoms, alicyclic and radicals having from 5 to 6 carbon atoms in the ring, phenyl and naphthyl.

2. A compound as defined in claim 1 wherein a is 1, b and c are 0, and n is 1.

3. A compound as defined in claim 1 wherein b is 1, and a and c are 0.

4. A compound as defined in claim 1 wherein c is 1, a and b are 0, and n is 1.

5. Zinc diisopropylphosphito borohydride.
6. Butylammonium diphenylphosphito borohydride.
7. Butylammonium di(2-chloroethyl) phosphito borohydride.
8. Hydrogen diisopropylphosphito borohydride.
9. Cadmium diisopropylphosphito borohydride.
10. Calcium diisopropylphosphito borohydride.
11. Lead diethylphosphito borohydride.
12. Butylammonium dimethylphosphito borohydride.
13. A process of preparing a compound of the formula

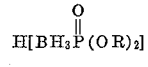

and the alkali metal salts thereof, where R is selected from the group consisting of saturated aliphatic radicals having from 1 to 18 carbon atoms, alicyclic radicals having from 5 to 6 carbon atoms, phenyl and naphthyl, which comprises reacting a compound selected from the group consisting of compounds of the formula

and the alkali metal derivatives thereof, where R has the same meaning as above, with diborane.

14. A process of preparing an alkali metal salt of an acid of the formula

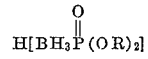

where R is selected from the group consisting of saturated aliphatic radicals having from 1 to 18 carbon atoms, alicyclic radicals having from 5 to 6 carbon atoms in the ring, phenyl and naphthyl, which comprises reacting an alkali metal derivative of

where R has the same meaning as above, with a trialkylamine borine.

15. A process of preparing an alkali metal salt of an acid of the formula

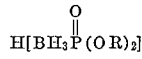

where R is selected from the group consisting of saturated aliphatic radicals having from 1 to 18 carbon atoms, alicyclic radicals having from 5 to 6 carbon atoms in the ring, phenyl and naphthyl, which comprises reacting a compound of the formula $$HP(OR)_2 \; \overset{O}{\|}$$

where R has the same meaning as above, with an alkali metal borohydride in the presence of a promoter selected from the group consisting of lower dialkyl ketones, lower alkyl aldehydes and benzaldehyde.

16. A process of preparing an alkali metal salt of an acid of the formula $$H[BH_3 \overset{O}{\|} P(OR)_2]$$

where R is selected from the group consisting of saturated aliphatic radicals having from 1 to 18 carbon atoms, alicyclic radicals having from 5 to 6 carbon atoms in the ring, phenyl and naphthyl, which comprises reacting a compound of the formula $$HP(OR)_2 \; \overset{O}{\|}$$

where R has the same meaning as above, with an alkali metal borohydride in the presence of a promoter selected from the group consisting of carbon dioxide and saturated monocarboxylic acids having up to about 5 carbon atoms, and treating the product of such reaction with a reagent selected from the group consisting of alkali metal hydroxides and alkali metal carbonates.

17. A process of preparing an acid of the formula $$H[BH_3 \overset{O}{\|} P(OR)_2]$$

where R is selected from the group consisting of saturated aliphatic radicals having from 1 to 18 carbon atoms, alicyclic radicals having from 5 to 6 carbon atoms in the ring, phenyl and naphthyl, which comprises reacting a compound of the formula $$HP(OR)_2 \; \overset{O}{\|}$$

where R has the same meaning as above, with an alkali metal borohydride in the presence of a promoter selected from hydrohalic acids and boronfluoride etherates.

18. A process of preparing an acid of the formula $$H[BH_3 \overset{O}{\|} P(OR)_2]$$

where R is selected from the group consisting of saturated aliphatic radicals having from 1 to 18 carbon atoms, alicyclic radicals having from 5 to 6 carbon atoms in the ring, phenyl and naphthyl, which comprises reacting a compound of the formula $$HP(OR)_2 \; \overset{O}{\|}$$

where R has the same meaning as above, with an alkali metal borohydride in the presence of a promoter selected from the group consisting of carbon dioxide and saturated monocarboxylic acids having up to about 5 carbon atoms, and acidifying the product of such reaction with a hydrohalic acid.

19. A process of preparing a compound of the formula $$(R'_mNH_{4-m})_a(M)_b[BH_3 \overset{O}{\|} P(OR)_2]_n$$

where R' is an alkyl radical having from 1 to 8 carbon atoms; $m$ is a whole number from 0 to 3; M is a metal having from 1 to 2 free valences and selected from the group consisting of Li, Na, K, Be, Mg, Ca, Sr, Ba, Cu, Zn, Cd, Sn, Pb, Mn, Fe, Co, Ni and V; $a$ and $b$ are unlike integers selected from 0 and 1; $n$ is selected from 1 and 2 provided that $n$ is equal to the valence of the moiety outside the brackets in the above formula; and R is selected from the group consisting of saturated aliphatic radicals having from 1 to 18 carbon atoms, alicyclic radicals having from 5 to 6 carbon atoms in the ring, phenyl and naphthyl, which comprises reacting a compound of the formula $$H[BH_3 \overset{O}{\|} P(OR)_2]$$

where R has the same meaning as above, with a compound selected from the group consisting of ammonia, mono, di and trialkylamines wherein each alkyl group contains from 1 to 8 carbon atoms, and carbonates and hydroxides of metals selected from the group consisting of Li, Na, K, Be, Mg, Ca, Sr, Ba, Cu, Zn, Cd, Sn, Pb, Mn, Fe, Co, Ni and V.

References Cited in the file of this patent

UNITED STATES PATENTS 2,668,800    Johnston _____ Feb. 9, 1954

OTHER REFERENCES

Reetz: "J.A.C.S.," 82, No. 19 (Oct. 5, 1960), pages 5039–42. 260–461.315.